Aug. 1, 1950

G. M. BOUTON ET AL 2,517,380

METHOD OF ANALYSIS AND CONTROL OF
THE COMPOSITION OF LEAD ALLOYS
Filed Aug. 26, 1947

0.004% Ca      0.006% Ca      0.008% Ca 0.160   0.162   0.164   0.166   0.168
PER CENT Sb ADDED

INVENTORS G. M. BOUTON
G. S. PHIPPS
BY Edwin B. Cave
ATTORNEY

Patented Aug. 1, 1950

2,517,380

UNITED STATES PATENT OFFICE 2,517,380

METHOD OF ANALYSIS AND CONTROL OF THE COMPOSITION OF LEAD ALLOYS

George M. Bouton, Madison, and George S. Phipps, Chatham, N. J., assignors to Bell Telephone Laboratories, Incorporated, New York, N. Y., a corporation of New York Application August 26, 1947, Serial No. 770,626

4 Claims. (Cl. 23—230)

This invention relates to analytical methods for determining the amount of a minor constituent in an alloy and to methods for controlling the amount of such constituent in an alloy by utilizing these analytical methods.

Since the analytical method of this invention is outstandingly adapted to the determination of minor amounts of calcium in lead-calcium alloys, the method will be described first in connection with such determination.

The use of lead-calcium alloys for electrode grids for storage batteries has been suggested, but commercial development of storage batteries embodying such grids has been retarded seriously by the difficulty of controlling the calcium content of the grids. Although the limits of calcium content are rather broad, they must be adhered to since an excess of calcium causes rapid growth of the positive plates and too little calcium is accompanied by inferior physical properties.

Using chemical methods, many hours of skillful analytical work are required to determine the calcium content of a melt of lead-calcium alloy prior to the casting of the grids and further hours are needed to determine the rate of change of the calcium content of the melt as casting proceeds. Since the calcium content of the melt will ordinarily drift during the time required for performing the chemical analysis, no means has existed hitherto for determining the momentary calcium content accurately or for controlling the calcium content within the desired range.

The present invention provides a method whereby determination of the calcium content of such lead-calcium alloys can be made in a matter of minutes at the location of the casting operation, with high accuracy, and by personnel unskilled in analytical methods. With this method of rapid calcium determination available, immediate corrections can be made in the calcium content of the melt. This procedure eliminates calcium control difficulties and removes a major obstacle to commercial fabrication of lead-calcium storage batteries.

The analytical procedure of the present invention is based upon the fact that calcium and anitmony cannot both remain as separate entities in molten lead at normal casting temperatures, but interact to form a constituent, probably an intermetallic compound, which floats to the surface until only the element which is in excess of the stoichiometric equivalent of the other element remains in solution in the melt. This phenomenon permits the subtraction of known amounts of calcium from lead-calcium alloys by the addition of easily calculated quantities of antimony. It is therefore possible to titrate calcium against antimony in the molten alloy until a visually recognizable end-point of known calcium content is reached.

A suitable end-point is provided by the marked difference in the surface appearance which occurs upon a slight change in calcium content in chill-cast lead-calcium test ingots containing very small amounts of calcium. An ingot of high purity lead, such as corroding lead, when chill-cast in air in a shallow mold, shows a faint bluish film. Addition of .002 per cent calcium causes the surface of the ingot to assume a brilliant specular luster similar to that of a still pool of mercury. A slightly increased percentage of calcium causes a distinctive gray film to form on the surface of the ingot.

This change in surface appearance can be seen by reference to the accompanying drawing in which.

Figure 1:
Fig. 1 is a representation of three test ingots having calcium contents in the range referred to above showing the surface appearance of these ingots.

The three test ingots of Fig. 1 were cast from lead-calcium alloys containing .004 per cent calcium, .006 per cent calcium, and .008 per cent calcium, by weight, respectively. The ingot at the left, to which .004 per cent calcium has been added, still retains the brilliant specular surface. The ingot at the right, to which .008 per cent calcium has been added, has its surface almost completely covered with a gray film. The middle ingot, to which .006 per cent calcium has been added, shows an appreciable quantity of the gray film scattered over the specular background.

The calcium content at which a faint trace of the gray film is present is used as the end-point. With corroding lead, which is a lead of high purity, this end-point corresponds to .005 per cent calcium. The calcium content at the end-point varies slightly with the purity of the lead as will be discussed in more detail below.

By conducting casting tests on a series of alloys whose calcium contents have been established by precise chemical analytical methods, the amount of calcium removed by a given amount of antimony from an alloy formed from any grade of lead can be determined. It is then possible by adding successive known portions of antimony to a lead-calcium alloy of unknown calcium content to determine exactly how much calcium must be removed to bring the calcium content down to that corresponding to the end-point which in high purity alloys occurs at .005 per cent calcium.

This analytical procedure is well adapted to the determination of calcium in lead-calcium alloys having calcium contents varying from the endpoint, or .005 per cent calcium, up to 2 per cent or more. It is, thus, well adapted for calcium determination in the range of calcium content required for storage battery grids, for which calcium contents within the range of .065 per cent to .090 per cent are required.

The titration of calcium against antimony may be carried out in several ways. One way in which this can be done is by taking a number of samples from the melt to be analyzed, adding different weighed amounts of antimony to each sample, chill-casting the samples to form test ingots, and selecting that ingot having a surface appearance most nearly resembling that of the end-point alloy referred to above. The calcium content of the melt can be determined from the amount of antimony added to the selected ingot by reference to a chart or table previously prepared by determining the amount of antimony required to produce an end-point alloy from lead-calcium alloys of various known calcium contents.

In taking the initial samples from the melt, weighing of the samples can be eliminated by casting the molten samples in a mold which yields ingots having a weight which is constant within about .1 per cent. These ingots may then be melted with weighed amounts of antimony by a procedure as described below. The antimony may be added in any convenient form which will not reduce the accuracy of the process excessively. The addition of pure antimony is not practical since it would involve the loss of an unknown amount by volatilization and oxidation during melting.

It is most convenient to add antimony in the form of a lead-antimony alloy containing about 1 per cent antimony. This concentration of antimony in the lead-antimony titrating alloy is the maximum which can be used without the risk of serious segregation of antimony during the casting of the lead-antimony alloy. Lower antimony concentrations may be used but they result in undesirable bulk because of the additional lead which is present.

The melting of the lead-calcium samples with the lead-antimony titrating alloy may be carried out as follows. A sample of known weight, conveniently 60 to 100 grams, of the alloy of unknown calcium content is melted with a weighed quantity of a lead-antimony alloy containing 1 per cent antimony. A 1¾ inch diameter sheet iron crucible held over a Bunsen burner with about a 4-inch flame is a convenient means of melting. The lead-antimony is placed in the bottom of the crucible where it melts first and permits the lead-calcium to feed into the molten pool with a minimum oxidation of the contained calcium.

About 4 seconds after the melting is complete, the mix is removed from the flame and stirred by a few twirls of a small stainless steel paddle. The paddle must be completely submerged so as not to break the surface of the melt during stirring. The melt is then cast into a horizontal open mold, such as may be made by milling a depression into the surface of a ¾ inch thick iron block. A convenient size ingot is about ⅝ inch wide, 4 inches long, 1/16 inch thick at the pouring end and ½ inch thick at the other end.

Figure 2:
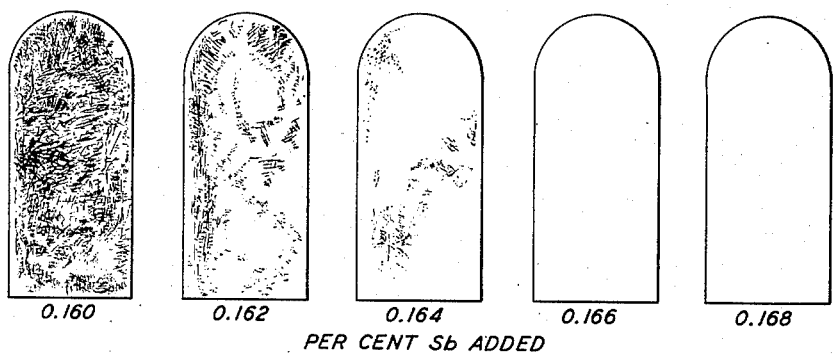
Fig. 2 is a representation of a number of test ingots resulting from a titration procedure as described below.

A group of castings from a typical analysis determination is represented in Fig. 2. These castings were made by taking a number of sample specimens from the melt on which the calcium determination was to be made and adding different weighed amounts of a lead-antimony alloy to each specimen in the manner described above. The two castings at the right side of the figure are bright indicating that too much antimony had been added to the mix, or in other words that the calcium content of the unknown was lower than the calcium equivalent of the antimony added. The three ingots at the left have a gray surface film indicating that insufficient antimony had been added to bring the calcium content down to the end-point. The end-point in this case lies between the third and fourth ingots from the left. This indicates that the amount of antimony required to reduce the calcium content to the end-point was between .164 per cent and .166 per cent by weight of the sample.

Figure 3:
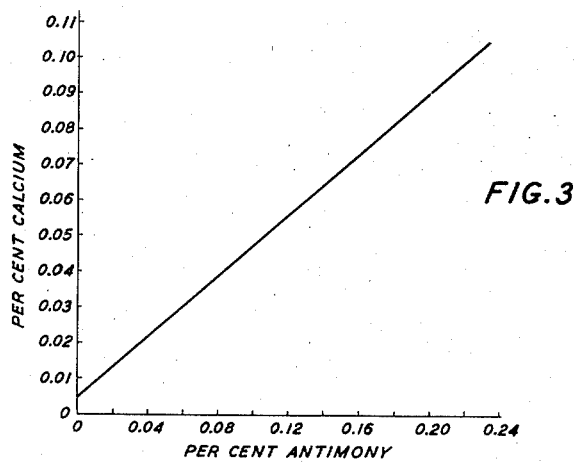
Fig. 3 is a chart showing the amount of antimony necessary to reduce lead-calcium alloys of varying calcium content to the end-point.

With this information, the calcium content of the alloy tested can readily be determined by reference to the chart in Fig. 3. This chart was prepared by melting together different proportions of lead-calcium alloys and lead-antimony alloys containing 1 per cent antimony, which had been especially prepared to insure uniformity, and determining the exact proportion necessary to produce end-point condition in test ingots with lead-calcium alloys of varying calcium content. When the results of these determinations were plotted as per cent added antimony against per cent calcium content in the sample, it was found that substantially a straight line relationship existed.

Using, on the chart of Fig. 3, values of added antimony required to produce the end-point in the determination shown in Fig. 2, it can be seen that the calcium content of the sample tested lies between .075 per cent (corresponding to .164 per cent antimony) and .076 per cent (corresponding to .166 per cent antimony). For process control it is usually not necessary to space the antimony percentages as closely as those indicated in Fig. 2.

Should the calcium remaining in the melt after the antimony has been added exceed about .03 per cent, a satinlike surface will appear on the test ingot which is readily distinguishable from the bright surface found slightly below the end-point and the gray surface found slightly above the end-point. It will, therefore, be obvious in that case that additional test ingots will have to be prepared having larger additions of antimony.

Except where greatest precision is required, no undue refinements in technique are necessary. The crucible used for melting should be free from metallic particles, but the presence of a lead oxide coating does not interfere with the result. The pouring temperature is not critical over a fairly wide range and it may be controlled sufficiently by estimating the 4-second heating period after melting is complete. Repeated casting of ingots will cause the mold to heat, but unless its temperature exceeds about 70° C., there will be no adverse effects on the character of the casting.

The lead-calcium sample should be as massive as possible in order to reduce surface area and thus minimize oxidation of the calcium during melting. In commercial operation, samples may be removed from the melting kettle by means of a ladle using care to break the surface of the melt as little as possible.

In preparing the calibration chart of Fig. 3, it was essential for the antimony content of the titration alloy to be uniform and precisely known. Large castings and extruded material show variations of the order of .02 per cent antimony due to segregation. This would not interfere seriously with plant control, but would be unsatisfactory for calibration purposes where the highest precision is desired. The lead-antimony titration standards were made by alloying precisely weighed quantities of high purity antimony and lead under a zinc chloride-ammonium chloride flux and stirring until all of the antimony which could be seen floating on the surface was dissolved. The melt was chill-cast in the form of strips on a thick aluminum plate to prevent segregation of antimony during solidification.

In preparing the lead-calcium standards, precautions were necessary to avoid oxidation losses and to avoid the inclusion of calcium oxide. For this reason the molten alloy could not be poured into molds. Ingots weighing about 40 pounds were made by adding a lead-calcium alloy containing 1 per cent calcium to high purity lead. The lead was melted in an alundum coated cast iron kettle using no protective covering on the surface of the melt. After adjustment to the desired composition, the melts were frozen rapidly by spraying water on the outside of the containers. The ingots were then compressed vertically to a thickness of about 5/8 inch by a hydraulic press and samples for calcium determinations were sought from various locations. No segregation of calcium was observed in any of the ingots.

As indicated above, the titration end-point occurs at a calcium content of .005 per cent for alloys formed from high purity lead, such as corroding lead. The calcium content at the end-point will vary somewhat depending upon the grade of lead used in forming the alloy upon which the calcium determination is being made. Therefore, it is necessary to determine the calcium content at the end-point for the particular grade of lead used in forming the alloy which is being analyzed. The following table is typical of the influence of impurities in the lead on the calcium content at the end-point.

|  | Per Cent Impurities | | | | | Per cent Ca Present at End-Point |
| --- | --- | --- | --- | --- | --- | --- |
|  | Cu | Ag | Bi | Ni | Sb |  |
| Corroding Lead | 0.0003 | 0.0004 | 0.001 | ------ | 0.001 | 0.005 |
| Chemical Lead | 0.070 | 0.007 | 0.001 | 0.004 | 0.002 | 0.009 |
| Acid Lead | 0.070 | 0.0002 | 0.030 | ------ | 0.002 | 0.007 |

In the titration methods described above, control of the calcium content of a lead-calcium melt is achieved by taking a number of samples of the melt, adding different weighed amounts of antimony to the respective samples, casting the samples into ingots and selecting that ingot having a surface appearance most closely resembling that of an ingot cast from the end-point alloy. In this manner the calcium content of the melt can be accurately determined, and can, therefore, be adjusted to bring it within the required limits. The control of the calcium content of such melts can also be achieved by methods in which the fundamental principles of the principal invention are applied in a different manner. For instance, two samples of the melt can be taken, and to them can be added weighed amounts of antimony; one of these weighed amounts of antimony corresponding to that required to produce the end-point in a lead calcium alloy containing the minimum permissible amount of calcium, and the other weighed amount of antimony corresponding to that required to produce the end-point in a lead-calcium alloy containing the maximum permissible amount of calcium. When the two ingots cast from these samples give a surface appearance on opposite sides of the end-point, that is when one is completely bright and the other is covered with a gray film, the calcium content of the melt is known to be within the required limits. However, when both ingots are above or below the end-point, it is known that the calcium content is too high or too low and the proper adjustment of the melt can be made to bring the calcium content back within the required limits.

Where the permissible limits of calcium content in the melt are very narrow, it is apparent that the same sort of result can be obtained using a single test specimen to which is added the amount of antimony required to reduce the calcium content from the desired calcium content of the melt to the end-point. When the ingot cast from this specimen deviates above or below the end-point, the calcium content of the melt can be adjusted accordingly.

The end-point used in the determinations referred to above was selected because of its ease of detection and because of the fact that it occurs at a low calcium content. It is, however, feasible to work to other end-points which present a visually recognizable surface appearance in cast ingots at definite calcium contents.

United States Patent 2,425,725, issued August 19, 1947 to G. M. Bouton and E. E. Schumacher, describes a method for determining calcium in lead-calcium alloys within the range of about .023 per cent to about .033 per cent calcium by casting a set of standard ingots of known calcium content in an atmosphere of controlled humidity and carbon dioxide content. The sample of unknown calcium content is cast under similar conditions and its calcium content is found by comparing the surface appearance of the cast ingot with the characteristic surface appearances of the standard ingots of known calcium content.

Any standard ingot of this type within the range set forth may be used to provide an end-point for a calcium determination with an alloy having a higher calcium content than the standard ingot. Known amounts of antimony are added to the specimens of the alloy on which the determination is being run, as described above, and these specimens are then cast into test ingots under the same controlled atmosphere conditions as those under which the standard ingot was prepared. From the calcium content of the standard ingot and the calcium equivalent of the amount of antimony added to the test ingot having a surface appearance most nearly resembling the standard ingot, the initial calcium content of the alloy can be determined.

It is not necessary to use a fixed end-point. For instance, sufficient antimony can be added to an alloy of unkown calcium content to bring the calcium content within the range of that of the standard ingots in United States Patent 2,425,725.

The calcium content of the alloy can be determined, by casting it into a test ingot under the same conditions as those under which the standard ingots were cast, from the calcium content of the standard most closely resembling the test ingot and the calcium equivalent of the antimony added to the alloy.

The titration of calcium against antimony has been described above in connection with the determination of calcium in lead-calcium alloys. It is apparent that it can be applied equally well in the determination of antimony in lead-antimony alloys and in the control of the antimony content of such alloys. In applying the procedure to the determination of antimony, analogous techniques are used except that the titration is accomplished by taking samples of the lead-antimony alloy and adding sufficient calcium thereto, preferably in the form of a lead-calcium alloy, to remove the antimony from the alloy and bring the calcium content to the calcium end-point described above. By calibrating antimony content against amount of added calcium to reach the end-point, it is possible by techniques analogous to those described above, either to determine precisely the antimony content of the specimen, or to determine whether the antimony content of the melt has deviated from the required limits and requires correction.

The invention has been described above in terms of specific embodiments. The specific embodiments are intended to be illustrative and not limiting, and the invention is intended to include those modifications and equivalents which would be apparent to one skilled in the art from the description above.

What is claimed is:

1. The method of analyzing a lead alloy containing one member of the group consisting of calcium and antimony which comprises taking a plurality of test specimens of equal weight from said alloy, adding to and mixing with each of said test specimens, in the molten state, a varying amount of the other metal of said group, to reduce the amount of original alloying metal, such that each specimen of said series differs successively in the amount of added metal, casting a test ingot from each of said test specimens, establishing a standard ingot containing a known amount of calcium and having a surface appearance characteristic of its calcium content, and placing said test ingots and said standard ingot in adjacent positions so that the test ingot most closely resembling the standard ingot in appearance can be selected and the amount of original alloying metal therein can be calculated, from the known added amount of said other metal, to an accuracy determined by the magnitude of the difference in weight of the successive amounts of said other metal added to the successive test specimens.

2. The method of analyzing a lead alloy containing one member of the group consisting of calcium and antimony which comprises taking a plurality of test specimens of equal weight from said alloy, adding to and mixing with each of said test specimens, in the molten state, a varying amount of the other metal of said group, to reduce the amount of original alloying metal, such that each specimen of said series differs successively in the amount of added metal, and casting a test ingot from each of said test specimens, whereby the content of original alloying metal in the alloy can be calculated, to an accuracy determined by the magnitude of the difference in weight of the successive amounts of said other metal added to the successive test specimens, from the amount of said other metal added to the test specimen producing that test ingot most closely resembling a standard ingot which has a characteristic surface appearance which has a known content of calcium and which has been cast from an alloy, differing from the test alloy substantially only in content of said alloying ingredient, by a technique substantially identical with that used in casting the ingots from the test specimens.

3. The method described in claim 2 wherein the original alloying metal is calcium.

4. The method described in claim 2 wherein the original alloying metal is antimony.

GEORGE M. BOUTON.
GEORGE S. PHIPPS.

REFERENCES CITED

The following references are of record in the file of this patent:

UNITED STATES PATENTS

| Number | Name | Date |
|---|---|---|
| 1,285,511 | Werner | Nov. 19, 1918 |
| 1,428,041 | Kroll | Sept. 5, 1922 |
| 1,534,032 | Gabriel | Apr. 21, 1925 |
| 2,053,655 | Deitz, Jr., et al. | Sept. 8, 1936 |
| 2,253,574 | Norbeck | Aug. 26, 1941 |
| 2,425,725 | Bouton, et al., | Aug. 19, 1947 |

OTHER REFERENCES

Vickers: "Metals and Their Alloys," 1923, published by Henry Carey Baird and Co., New York city, pages 511, 512.

Thews: "Metallurgy of White Metal Scrap and Residues," 1930, published by D. Van Nostrand and Co., New York city, page 188.